(12) United States Patent
Takahashi et al.

(10) Patent No.: US 10,409,369 B2
(45) Date of Patent: *Sep. 10, 2019

(54) DISPLAY CONTROL APPARATUS AND DISPLAY CONTROL METHOD TO RECOGNIZE CHARACTER OF A POINTING POSITION

(71) Applicant: SONY CORPORATION, Tokyo (JP)

(72) Inventors: Kei Takahashi, Tokyo (JP); Shinichi Kawano, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 15/919,423

(22) Filed: Mar. 13, 2018

(65) Prior Publication Data

US 2018/0203508 A1 Jul. 19, 2018

Related U.S. Application Data

(63) Continuation of application No. 14/570,172, filed on Dec. 15, 2014, now Pat. No. 9,958,940.

(30) Foreign Application Priority Data

Dec. 26, 2013 (JP) ................................. 2013-270049

(51) Int. Cl.
G06F 3/01 (2006.01)
G06F 3/0487 (2013.01)
G06F 3/0488 (2013.01)

(52) U.S. Cl.
CPC ............ *G06F 3/013* (2013.01); *G06F 3/0487* (2013.01); *G06F 3/04886* (2013.01)

(58) Field of Classification Search
None
See application file for complete search history.

(56) References Cited

U.S. PATENT DOCUMENTS

| 8,484,573 | B1* | 7/2013 | Zhai ...................... G06F 3/0237 345/168 |
| 8,576,180 | B2 | 11/2013 | Wang et al. |
| 8,749,494 | B1 | 6/2014 | Delker et al. |
| 9,158,388 | B2 | 10/2015 | Ghassabian |

(Continued)

FOREIGN PATENT DOCUMENTS

JP 2011-191811 A 9/2011

OTHER PUBLICATIONS

Notice of Allowance for U.S. Appl. No. 14/570172, dated Dec. 18, 2017, 9 pages.

(Continued)

*Primary Examiner* — Kent W Chang
*Assistant Examiner* — Benjamin Morales
(74) *Attorney, Agent, or Firm* — Chip Law Group

(57) ABSTRACT

Provided is a display control apparatus including a display control unit that controls a display unit in a manner that a plurality of symbols is visibly displayed to a user, and a position acquisition unit that acquires information indicating a pointing position for specifying one or more symbols among the plurality of symbols. The display control unit controls the display unit in a manner that a predetermined object is displayed to indicate a group to which the plurality of symbols belongs according to the pointing position.

7 Claims, 14 Drawing Sheets

(56) References Cited

U.S. PATENT DOCUMENTS

| | | |
|---|---|---|
| 2005/0140660 A1 | 6/2005 | Valikangas |
| 2008/0291171 A1* | 11/2008 | Shin ..................... G06F 3/0481 345/168 |
| 2009/0289895 A1 | 11/2009 | Nakada et al. |
| 2010/0013852 A1 | 1/2010 | Liu |
| 2010/0220061 A1 | 9/2010 | Bos et al. |
| 2011/0078567 A1* | 3/2011 | Kim ..................... G06F 3/0236 715/702 |
| 2011/0128230 A1 | 6/2011 | Griffin |
| 2011/0179374 A1* | 7/2011 | Yagi ..................... G06F 3/0418 715/773 |
| 2012/0229320 A1 | 9/2012 | Yu |
| 2014/0295918 A1* | 10/2014 | Grifoni .............. H04M 1/7253 455/566 |
| 2014/0337740 A1 | 11/2014 | Kwon et al. |
| 2015/0049112 A1* | 2/2015 | Liu ...................... G06T 19/006 345/633 |
| 2016/0132233 A1* | 5/2016 | Ghassabian ........... G06F 3/0237 715/773 |
| 2016/0259548 A1* | 9/2016 | Ma ....................... G06F 1/1626 |

OTHER PUBLICATIONS

Advisory Action for U.S. Appl. No. 14/570172, dated Nov. 17, 2017, 2 pages.

Final Office Action for U.S. Appl. No. 14/570172, dated Aug. 25, 2017, 15 pages.

Non-Final Office Action for U.S. Appl. No. 14/570172, dated Nov. 30, 2016, 16 pages.

\* cited by examiner

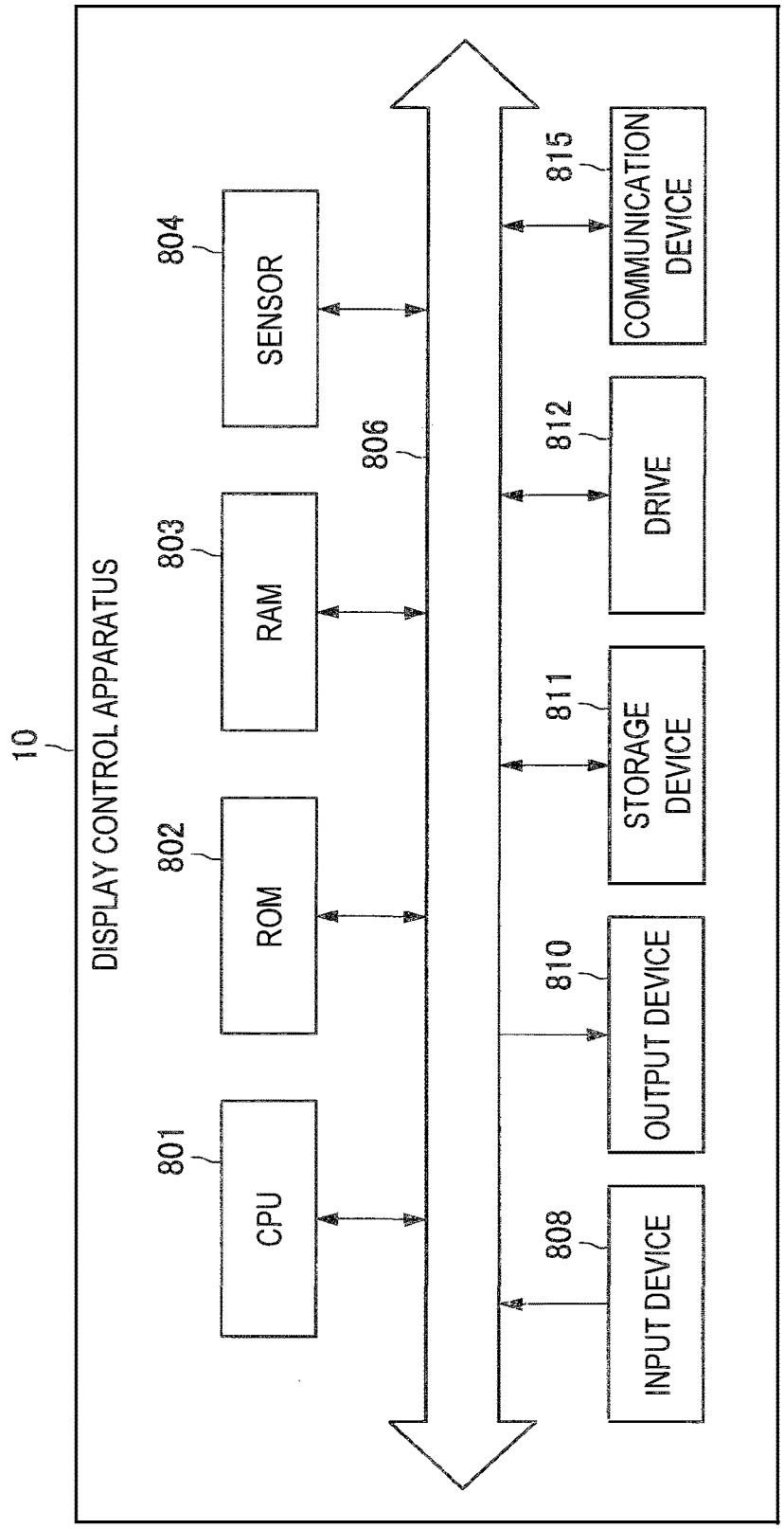

DISPLAY CONTROL APPARATUS AND DISPLAY CONTROL METHOD TO RECOGNIZE CHARACTER OF A POINTING POSITION

CROSS REFERENCE TO RELATED APPLICATIONS

The present application is a continuation application of U.S. patent application Ser. No. 14/570,172, filed on Dec. 15, 2014, which claims the benefit of Japanese Priority Patent Application JP 2013-270049, filed on Dec. 26, 2013. Each of the above-referenced applications is hereby incorporated herein by reference in its entirety.

BACKGROUND

The present disclosure relates to a display control apparatus, a display control method, and a program.

Recently, there are disclosed technologies for allowing a user to recognize a symbol of a pointing position by a user. For example, there is disclosed a technology for allowing a user to recognize a symbol of a pointing position by displaying an object with respect to the symbol of the pointing position (see, for example, JP 2011-191811A).

SUMMARY

However, even if an object is displayed on a symbol of a pointing position, a user may not recognize information on the symbol corresponding to the pointing position. Therefore, it is desirable to provide a technology that can allow a user to more reliably recognize information on a symbol corresponding to a pointing position.

According to an embodiment of the present disclosure, there is provided a display control apparatus including a display control unit configured to control a display unit in a manner that a plurality of symbols is visibly displayed to a user, and a position acquisition unit configured to acquire information indicating a pointing position for specifying one or more symbols among the plurality of symbols. The display control unit controls the display unit in a manner that a predetermined object is displayed to indicate a group to which the plurality of symbols belongs according to the pointing position.

According to another embodiment of the present disclosure, there is provided a display control method including controlling a display unit in a manner that a plurality of symbols is visibly displayed to a user, acquiring information indicating a pointing position for specifying one or more symbols among the plurality of symbols, and causing a processor to control the display unit in a manner that a predetermined object is displayed to indicate a group to which the plurality of symbols belongs according to the pointing position.

According to another embodiment of the present disclosure, there is provided a program for causing a computer to function as a display control apparatus including a display control unit configured to control a display unit in a manner that a plurality of symbols is visibly displayed to a user, and a position acquisition unit configured to acquire information indicating a pointing position for specifying one or more symbols among the plurality of symbols. The display control unit controls the display unit in a manner that a predetermined object is displayed to indicate a group to which the plurality of symbols belongs according to the pointing position.

According to the present disclosure described above, it is possible to allow a user to more reliably recognize information related to a symbol corresponding to a pointing position. Note that the above effects are not necessarily limited thereto. In addition to or alternative to the above effects, any one of effects that are set forth in the present specification or other effect that can be grasped from the present specification may be achieved.

BRIEF DESCRIPTION OF THE DRAWINGS

FIG. 14 is a diagram illustrating an example of a hardware configuration of a display control apparatus.

DETAILED DESCRIPTION OF THE EMBODIMENT(S)

Figure 1:
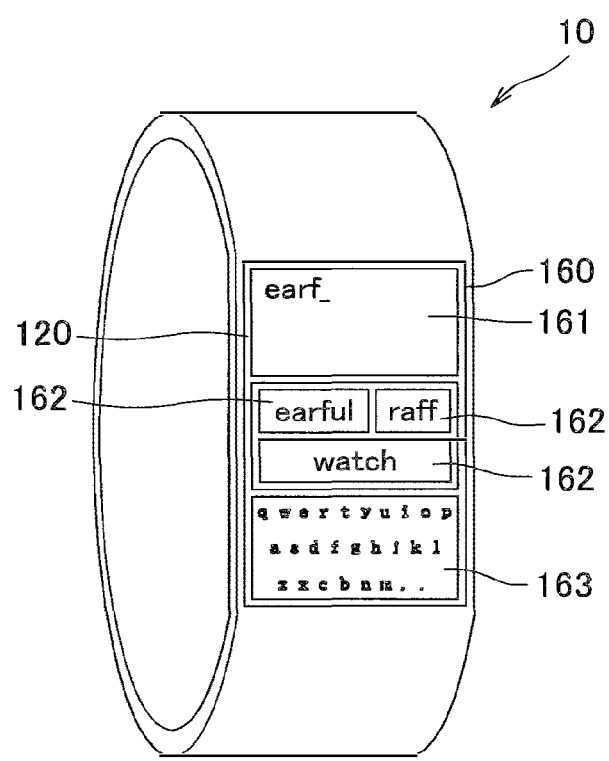
FIG. 1 is a diagram illustrating an example of appearance of a display control apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in this specification and the appended drawings, there are some cases where multiple structural elements that have substantially the same function and structure are distinguished from one another by being denoted with different alphabets or numbers after the same reference numerals. However, in a case where it is unnecessary to distinguish the multiple structural elements that have substantially the same function and structure from one another, the multiple structural elements are denoted with the same reference numeral only.

Note that description will be provided in the following order.

1. Overview of Display Control Apparatus
2. Example of Functional Configuration of Display Control Apparatus
3. Detailed Function of Display Control Apparatus
4. Example of Hardware Configuration of Display Control Apparatus
5. Conclusion

1. OVERVIEW OF DISPLAY CONTROL APPARATUS

First, an overview of a display control apparatus 10 according to an embodiment of the present disclosure will be described. FIG. 1 is a diagram illustrating an example of appearance of a display control apparatus 10 according to an embodiment of the present disclosure. Referring to FIG. 1, the display control apparatus 10 includes an input unit 120 and a display unit 160. The input unit 120 detects a user operation and outputs the detected user operation to a control unit 110 as also described below. Also, the display unit 160 displays a selection result screen 161, a selection candidate screen 162, and a symbol input screen 163.

The symbol input screen 163 is a screen on which a plurality of symbols is displayed. In FIG. 1, a keyboard on which a plurality of alphabets is displayed is displayed as an example of the screen on which the plurality of symbols is displayed, and alphabets are displayed as an example of the symbols. However, the symbols are not limited to the alphabets. For example, the symbols may be non-alphabetic characters (for example, Chinese characters, hiragana, katakana, numbers, or the like), or may be marks (for example, parentheses, or the like).

The selection candidate screen 162 is a screen on which selection candidates are displayed. Here, the selection candidate may be an extraction result from recorded data corresponding to a pointing position by a user with the symbol input screen 163. The recorded data may be any data. For example, the recorded data may be data selected in the past by the user (hereinafter, also referred to as "user selection history") or may be dictionary data recorded in advance. Note that, in the example illustrated in FIG. 1, three selection candidate screens 162 are present, but the number of the selection candidate screens 162 is not particularly limited.

The selection result screen 161 is a screen on which a result selected from the selection candidates is displayed as a selection result. FIG. 1 illustrates an example in which "earf", a combination of symbols "e", "a", "r", and "f" closest to pointing positions when a user performs pointing four times, is displayed on the selection result screen 161. On the selection result screen 161, the result selected from the selection candidates can be displayed as the selection result. The user can edit a sentence by adding the selection result on the selection result screen 161.

In FIG. 1, an example in which the display control apparatus 10 is configured by a wristband type display apparatus is illustrated, but the display control apparatus 10 may be realized by wearable display devices, such as a head mount display (HMD), other than the wristband type display device. Also, the display control apparatus 10 may also be applied to a smartphone, a video camera, a digital camera, a personal digital assistants (PDA), a personal computer (PC), a mobile phone, a portable music reproduction device, a portable video processing device, a portable game machine, and the like. Here, for example, in order to allow the user to recognize the symbol of the pointing position by the user, it is assumed to display objects corresponding to symbols of pointing positions among the plurality of symbols displayed on the symbol input screen 163. However, even if the object is displayed on the symbol of the pointing position, the user may not recognize information on the symbol corresponding to the pointing position.

For example, in a case where the display unit 160 is small just like the wristband type display device, there easily occurs a situation that the object displayed on the symbol of the pointing position is hidden by a user's finger. In a case where such a situation occurs, the user may not recognize information on the symbol corresponding to the pointing position. Therefore, in this specification, there is proposed a technology capable of allowing a user to more reliably recognize information related to a symbol corresponding to a pointing position. In the above, the overview of the display control apparatus 10 according to the embodiment of the present disclosure was described.

2. EXAMPLE OF FUNCTIONAL CONFIGURATION OF DISPLAY CONTROL APPARATUS

Figure 2:
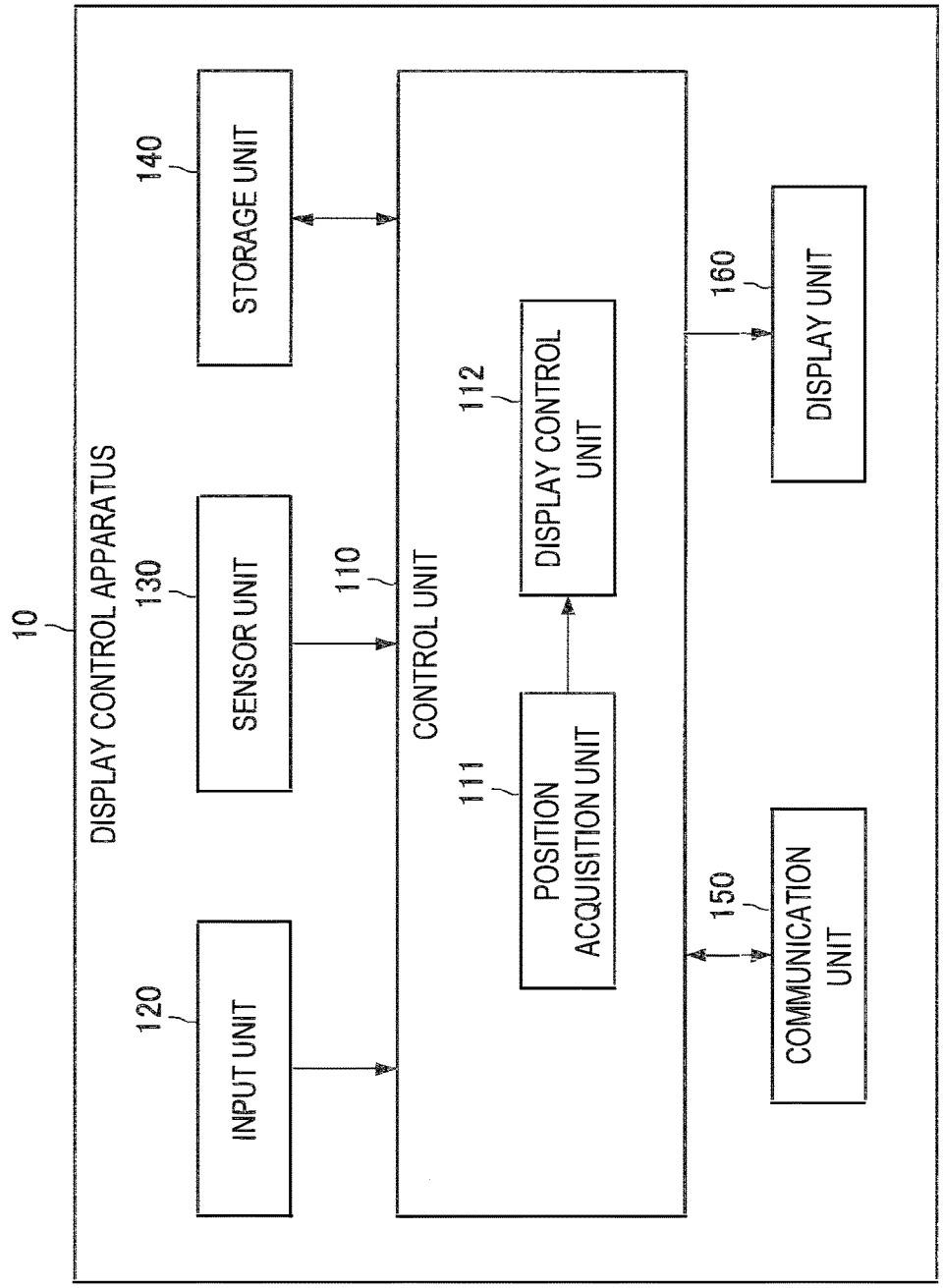
FIG. 2 is a diagram illustrating an example of functional configuration of a display control apparatus.

Subsequently, a functional configuration example of the display control apparatus 10 according to an embodiment of the present disclosure will be described. FIG. 2 is a diagram illustrating an example of functional configuration of the display control apparatus 10 according to an embodiment of the present disclosure. As illustrated in FIG. 2, the display control apparatus 10 includes a control unit 110, an input unit 120, a sensor unit 130, a storage unit 140, a communication unit 150, and a display unit 160.

The control unit 110 exhibits various functions of the control unit 110 by executing a program stored in the storage unit 140 or other storage medium. As illustrated in FIG. 2, the control unit 110 includes functional blocks, such as a position acquisition unit 111 and a display control unit 112. Functions of these functional blocks will be described in detail. The control unit 110 may be configured by a processor, such as a central processing unit (CPU), a graphics processing unit (GPU), a digital signal processor (DSP), or a system on chip (SoC). Also, the control unit 110 is configured by an electronic circuit for performing a variety of arithmetic processing.

The input unit 120 detects a user operation and outputs the detected user operation to the control unit 110. For example, in a case where the input unit 120 is configured by a touch panel, the user operation may correspond to an operation of tapping the touch panel. The touch panel may detect a contact of an operation body or may detect proximity of the operation body. However, the input unit 120 may be configured by hardware other than the touch panel. For example, in a case where the input unit 120 is configured by an imaging device and a line of sight of the user is detected from an image captured by the imaging device, the user operation corresponds to an operation of putting the line of sight. In the example illustrated in FIG. 2, the input unit 120 is integrated with the display control apparatus 10, but the input unit 120 may be configured separately from the display control apparatus 10.

The sensor unit 130 acquires sensor data. For example, the sensor unit 130 includes a triaxial acceleration sensor. The triaxial acceleration sensor measures a gravitational acceleration applied to the display unit 160 and generates sensor data (acceleration data) that three-dimensionally represents the magnitude and direction of the gravitational acceleration. Also, the sensor unit 130 may include a geomagnetic sensor. The geomagnetic sensor generates sensor data (geomagnetic data) representing a direction of geomagnetism in a coordinate system of the display unit 160. Also, the sensor unit 130 may include a gyro sensor. The gyro sensor measures an angular velocity of the display unit 160. In the example illustrated in FIG. 2, the sensor unit 130 is integrated with the display control apparatus 10, but the sensor unit 130 may be configured separately from the display control apparatus 10.

The storage unit 140 stores a program for causing the control unit 110 to operate by using a storage medium such as a semiconductor memory or a hard disk. Also, for example, the storage unit 140 can store various data to be used by the program. In the example illustrated in FIG. 2, the storage unit 140 is integrated with the display control apparatus 10, but the storage unit 140 may be configured separately from the display control apparatus 10.

The communication unit 150 can perform communication with other apparatus (for example, other display control apparatus 10). For example, in a case where the communication unit 150 performs communication with other display control apparatus 10, the communication unit 150 can perform communication through a network. The mode of the communication by the communication unit 150 is not particularly limited, and may be a wireless communication or a wired communication. In the example illustrated in FIG. 2, the communication unit 150 is integrated with the display control apparatus 10, but the communication unit 150 may be configured separately from the display control apparatus 10.

The display unit 160 displays a variety of information under the control of the control unit 110. The display unit 160 may be realized by a liquid crystal display (LCD), may be realized by an organic electro-luminescence (EL) display, may be realized by a projector, or may be realized by a hologram display. In the example illustrated in FIG. 2, the display unit 160 is integrated with the display control apparatus 10, but the display unit 160 may be configured separately from the display control apparatus 10. For example, a display device connected to the display control apparatus 10 by wire or wireless may be treated as the display unit 160. In the above, the example of functional configuration of the display control apparatus 10 according to the embodiment of the present disclosure was described.

3. DETAILED FUNCTION OF DISPLAY CONTROL APPARATUS

Subsequently, a function of the display control apparatus 10 according to an embodiment of the present disclosure will be described in detail. First, the display control unit 112 in the display control apparatus 10 controls the display unit 160 such that a plurality of symbols is visibly displayed to the user. Specifically, the display control unit 112 generates display control information for displaying a screen on the display unit 160 and outputs the generated display control information to the display unit 160. In this way, the display control unit 112 can control the display unit 160 such that the relevant screen is displayed on the display unit 160. Subsequently, the input unit 120 receives, from the user, the input of information indicating the pointing position for specifying one or more symbols among the plurality of symbols.

The position acquisition unit 111 acquires information indicating the pointing position from the input unit 120.

Here, the pointing position may be determined in any manner. For example, the pointing position may be determined based on at least one of the line-of-sight detection result and the detection result by the touch panel. Specifically, in a case where the input unit 120 includes an imaging device, the position acquisition unit 111 may acquire an image captured by the imaging device, detect a line of sight of the user from the acquired image, and determine a position of the detected light of sight as the pointing position. Also, in a case where the input unit 120 includes a touch panel, the position acquisition unit 111 determines a detection position detected by the touch panel as the pointing position.

Figure 3:
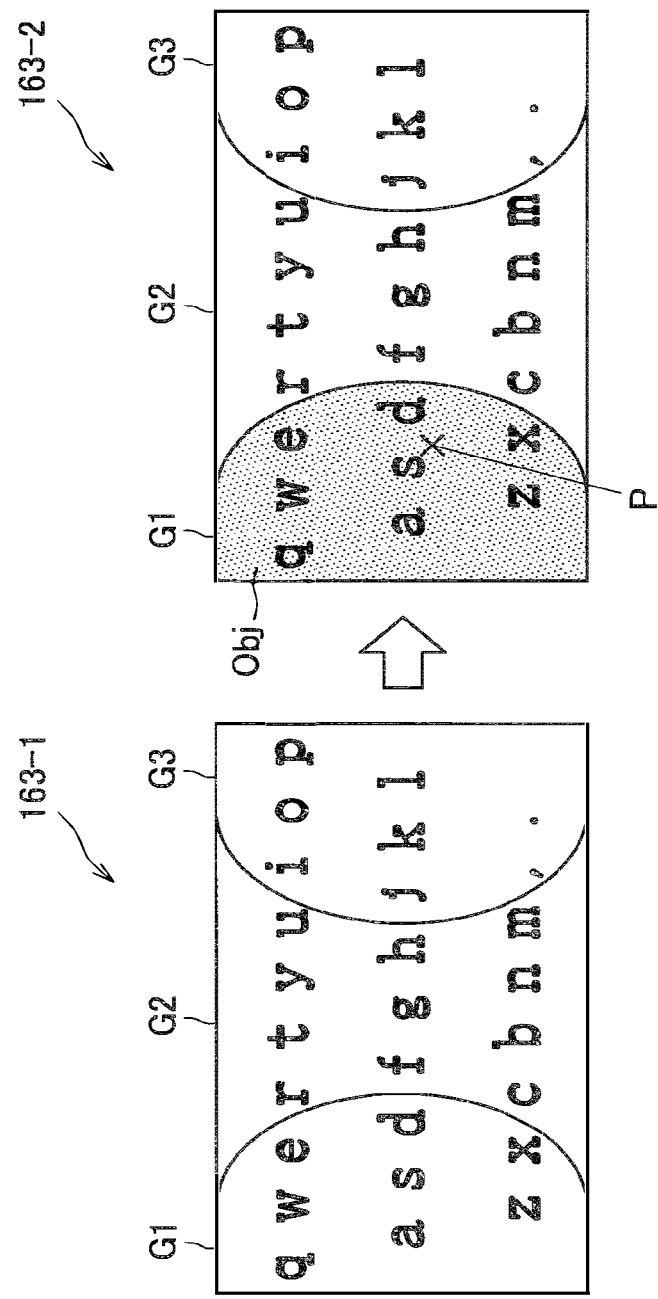
FIG. 3 is a diagram illustrating a first example of displaying an object corresponding to a pointing position.

Subsequently, the display control unit 112 controls the display unit 160 so as to display a predetermined object indicating a group to which a plurality of symbols belongs according to the pointing position. According to such a configuration, since the group is greater than the symbol, it is possible to allow a user to more reliably recognize information related to the symbol corresponding to the pointing position. Also, it is possible to reduce the possibility that will give the user a feeling of pressure that the user has to perform an accurate pointing with respect to a desired symbol, thereby allowing the user to perform the pointing more comfortably. Furthermore, since the possibility that an incorrect pointing will be performed between groups is smaller than the possibility that an incorrect pointing will be performed between symbols, it is possible to reduce the possibility that an incorrect pointing will be performed. A specific example will be described below with reference to FIG. 3. FIG. 3 is a diagram illustrating a first example of displaying an object corresponding to a pointing position. Referring to FIG. 3, a plurality of symbols is displayed on a symbol input screen 163-1.

Also, referring to FIG. 3, the plurality of symbols displayed in this manner is divided into three groups (groups G1 to G3). In the example illustrated in FIG. 3, the number of the groups is three, but the number of the groups is not particularly limited as long as symbols are divided such that a plurality of symbols belongs to each group. Also, in FIG. 3, a boundary between the groups is indicated by a curve, but the boundary between the groups may be any line or a straight line. Furthermore, in the example illustrated in FIG. 3, the boundary between the groups is displayed, but the boundary between the groups may not be displayed.

Subsequently, as illustrated in a symbol input screen 163-2, the input unit 120 receives, from the user, the input of information indicating a pointing position P among a plurality of symbols. The position acquisition unit 111 acquires information indicating the pointing position P from the input unit 120. The display control unit 112 controls the display unit 160 so as to display an object Obj indicating a group G1 corresponding to the pointing position P. More specifically, the display control unit 112 may control the display unit 160 so as to display the object Obj indicating the group G1 to which a symbol "s" closest from the pointing position P belongs.

In FIG. 3, an example in which the object Obj is displayed to fill the entire group G1 is illustrated, but a display form of the object Obj is not particularly limited as long as the group G1 can be recognized by the user. For example, the display control unit 112 may control the display unit 160 so as to display some objects associated with the group G1, or may control the display unit 160 so as to display some objects in the group G1.

Figure 4:
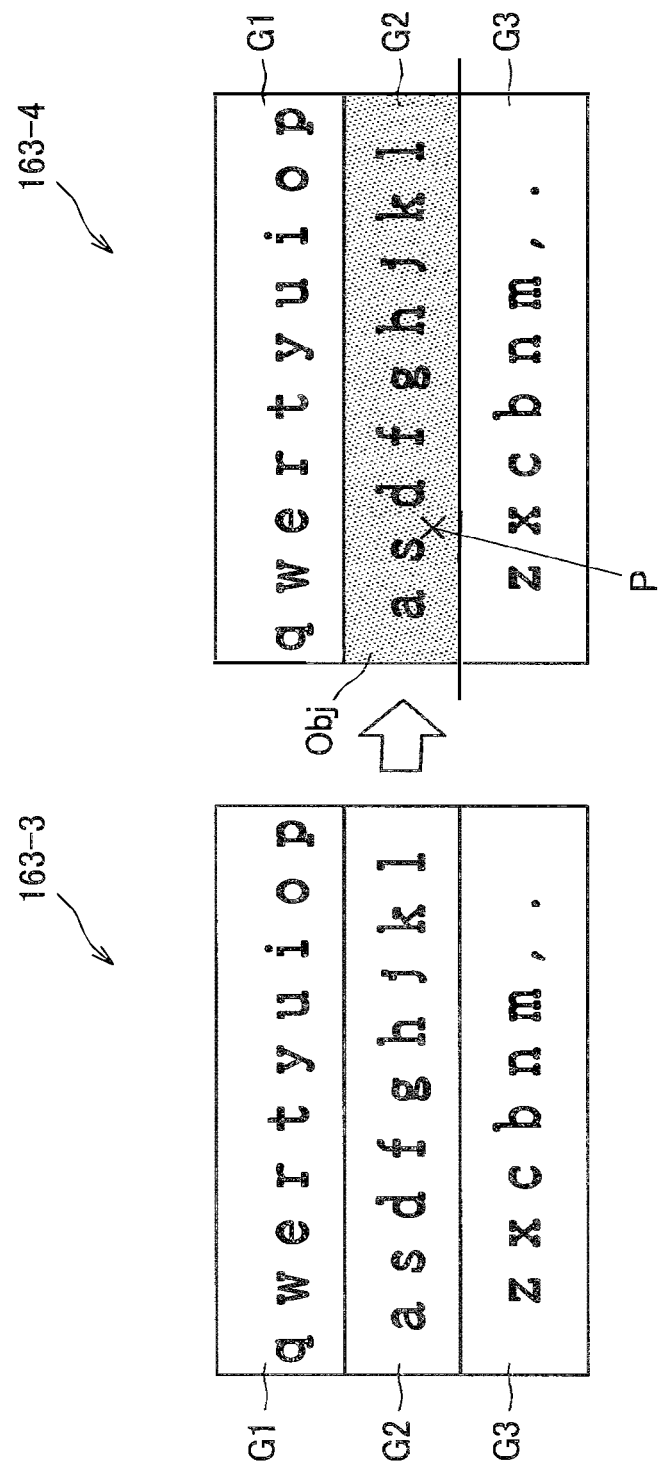
FIG. 4 is a diagram illustrating a second example of displaying an object corresponding to a pointing position.

In the above, the first example of displaying the object corresponding to the pointing position was described. Subsequently, a second example of displaying an object corresponding to a pointing position will be described with reference to FIG. 4. FIG. 4 is a diagram illustrating a second example of displaying an object corresponding to a pointing position. Referring to FIG. 4, in the second example, a plurality of symbols is displayed on a symbol input screen 163-3, as in the symbol input screen 163-1 of the first example.

Also, referring to FIG. 4, the plurality of symbols displayed in this manner is divided into three groups (groups G1 to G3). In the example illustrated in FIG. 4, the number of the groups is three, but the number of the groups is not particularly limited as long as symbols are divided such that a plurality of symbols belongs to each group. Also, in FIG. 4, a boundary between the groups is indicated by a straight line, but the boundary between the groups may be any line or may be a curve as described above. Furthermore, in the example illustrated in FIG. 4, the boundary between the groups is displayed, but the boundary between the groups may not be displayed.

Subsequently, as illustrated in a symbol input screen 163-4, the input unit 120 receives, from the user, the input of information indicating a pointing position P among a plurality of symbols. The position acquisition unit 111 acquires information indicating the pointing position P from the input unit 120. The display control unit 112 controls the display unit 160 so as to display an object Obj indicating a group G2 corresponding to the pointing position P. More specifically, the display control unit 112 may control the display unit 160 so as to display the object Obj indicating the group G2 to which a symbol "s" closest from the pointing position P belongs.

In FIG. 4, an example in which the object Obj is displayed to fill the entire group G2 is illustrated, but a display mode of the object Obj is not particularly limited as long as the group G2 can be recognized by the user. For example, the display control unit 112 may control the display unit 160 so as to display some objects associated with the group G2, or may control the display unit 160 so as to display some objects in the group G2.

In the above, the second example of displaying the object corresponding to the pointing position was described. Here, in each of the first example and the second example described above, the example of displaying the object indicating the group corresponding to the pointing position has been described, but a highlight display may be additionally performed so as to allow the user to recognize the symbol of the pointing position. Subsequently, an example of additionally performing a highlight display so as to allow a user to recognize a symbol of a pointing position will be described with reference to FIG. 5.

Figure 5:
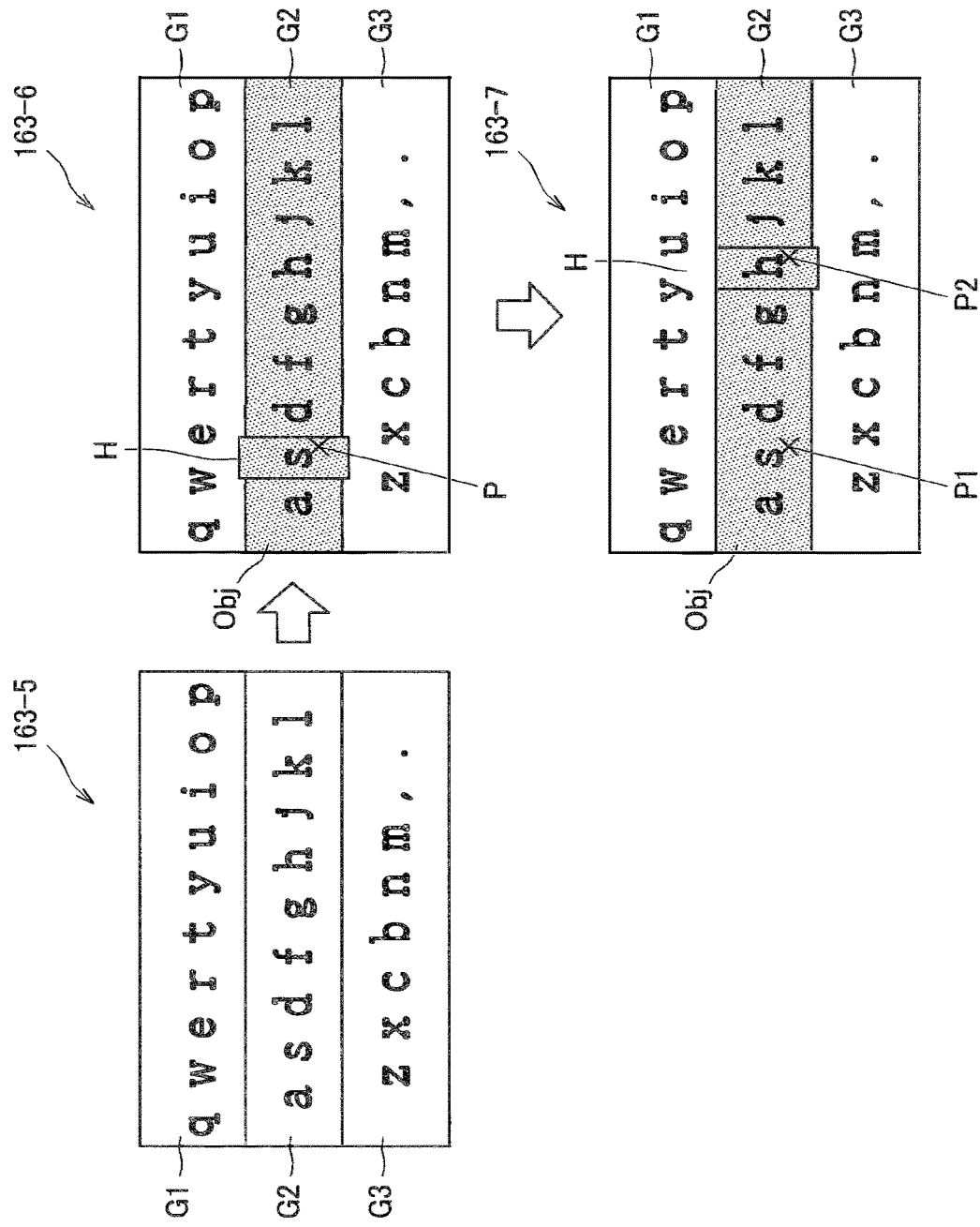
FIG. 5 is a diagram illustrating an example of attaching a highlight display to a symbol.

FIG. 5 is a diagram illustrating an example of attaching a highlight display to a symbol. Referring to FIG. 5, a plurality of symbols is displayed on a symbol input screen 163-5, as in the symbol input screen 163-3 of the second example. Also, referring to FIG. 5, the plurality of symbols displayed in this manner is divided into three groups (groups G1 to G3), as in the symbol input screen 163-3 of the second example.

Subsequently, as illustrated in a symbol input screen 163-6, the input unit 120 receives, from the user, the input of information indicating a pointing position P among the plurality of symbols. The position acquisition unit 111 acquires the information indicating the pointing position P from the input unit 120. The display control unit 112 controls the display unit 160 so as to display an object Obj indicating the group G2 corresponding to the pointing position P. More specifically, as in the symbol input screen 163-4 of the second example, the display control unit 112 may control the display unit 160 so as to display the object Obj indicating the group G2 to which a symbol "s" closest from the pointing position P belongs.

At this time, the display control unit 112 may attach a highlight display H to the symbol "s", of which a distance from the pointing position P is closest. In this way, the highlight display H is attached, it is possible to allow the user to recognize the symbol of the pointing position P. In the example illustrated in FIG. 5, the highlight display H is attached in a way of filling a rectangular region (a rectangular region a width of which is larger than a width of the object Obj) around the symbol "s", but the form of the highlight display H is not particularly limited. For example, the highlight display H may be attached by a form capable of distinguishing from the object Obj.

Also, the highlight display H may be movable in the group G2. For example, as illustrated in a symbol input screen 163-7, in a case where a pointing position P1 is moved to a pointing position P2 in the group G2, the display control unit 112 may move the highlight display H in the group G2. Since an amount of movement of the highlight display H is limited, the display control unit 112 may move the highlight display H based on a result obtained by multiplying a predetermined coefficient by an amount of movement from the pointing position P1 to the pointing position P2. Also, the object Obj and the highlight display H may be switched. For example, the object Obj and the highlight display H may be switched by a tap operation of the user, may be switched when duration of the tap operation of the user exceeds a threshold value, or may be switched when a pressing by the tap operation of the user exceeds a threshold value. A device that detects the operation of the user is not limited to the touch panel, and may be a gyro remote controller. In a case where the gyro remote controller is used, the object Obj and the highlight display H may be switched by an operation of pressing a button separate from a select button.

In the above, the example of additionally performing the highlight display so as to allow the user to recognize the symbol of the pointing position was described. As described above, a predetermined object indicating a group corresponding to a pointing position is displayed. The group corresponding to the pointing position may be used in any manner, but, for example, the display control unit 112 may perform data extraction from recorded data based on the symbol belonging to the group of the pointing position and display an extraction result extracted by the data extraction on the display unit 160. For example, the display control unit 112 may display the extraction result on the selection candidate screen 162.

For example, in the example illustrated in FIG. 4, it is assumed that the pointing position is present in the group G1. In such a case, symbols belonging to the group G1 of the pointing position is "q", "w", "e", . . . , "p". Therefore, the display control unit 112 may perform data extraction from recorded data based on the symbols "q", "w", "e", . . . , "p". More specifically, the display control unit 112 may extract data beginning with "q", "w", "e", . . . , "p" from the recorded data.

A priority may be assigned to the extraction result. For example, the display control unit 112 may preferentially display the extraction result on the display unit 160 based on the symbol, of which a distance from the pointing position is closest. Also, the display control unit 112 may preferentially display the extraction result on the display unit 160 based on the symbol, of which a distance from the pointing position is close. For example, since the number of the selection candidate screens 162 on which the extraction results are displayed is limited, the display control unit 112 may select the extraction results to be displayed in descending order of priority. Also, the display control unit 112 may determine the display positions of the extraction results according to the priority.

Also, the extraction results to be displayed are not limited to the extraction results based on one symbol. Therefore, the extraction results may be displayed based on a symbol string in which a plurality of symbols is combined. For example, the display control unit 112 may sequentially combine symbols belonging to the group of the symbol position whenever the pointing position is pointed, and control the display unit 160 such that the extraction result is displayed on the display unit 160, based on the symbol string generated as the combined result.

For example, in the example illustrated in FIG. 4, it is assumed that the first pointing position is present in the group G1. In such a case, symbols belonging to the group G1 of the first pointing position is "q", "w", "e", . . . , "p". Subsequently, it is assumed that a next pointing is continuously performed and the second pointing position is present in the group G2. In such a case, symbols belonging to the group G2 of the second pointing position is "a", "s", "d", . . . , "l". Therefore, the display control unit 112 may perform data extraction from recorded data based on a symbol string generated as a result obtained by combining any one of the symbols "a", "s", "d", . . . , "l" next to any one of the symbols "q", "w", "e", . . . , "p". More specifically, the display control unit 112 may extract, from recorded data, data beginning with a symbol string generated as a result obtained by combining any one of the symbols "a", "s", "d", . . . , "l" next to any one of the symbols "q", "w", "e", . . . , "p".

In the example illustrated in FIG. 1, "earful", "raff", and "watch" are recorded as the recorded data, and data "earful" beginning with a symbol string "ea" in which "a" is combined next to the symbol "e" is extracted from the recorded data. Also, data "raff" beginning with a symbol string "ra" in which "a" is combined next to the symbol "r" is extracted from the recorded data. Furthermore, data "watch" beginning with a symbol string "wa" in which "a" is combined next to the symbol "w" is extracted from the recorded data.

Subsequently, the display control unit 112 may display the extraction results on the display unit 160 as the selection candidates. In the example illustrated in FIG. 1, each of the extraction results "earful", "raff", and "watch" is displayed as the selection candidate screen 162. When the user performs an operation of selection from the selection candidates, the display control unit 112 displays a result selected from the selection candidates on the display unit 160 as a selection result. The operation of selection from the selection candidates is not particularly limited. Therefore, as described above, the operation of selection from the candidates may be an operation of tapping the touch panel, or may be an operation of putting the line of sight.

Figure 6:
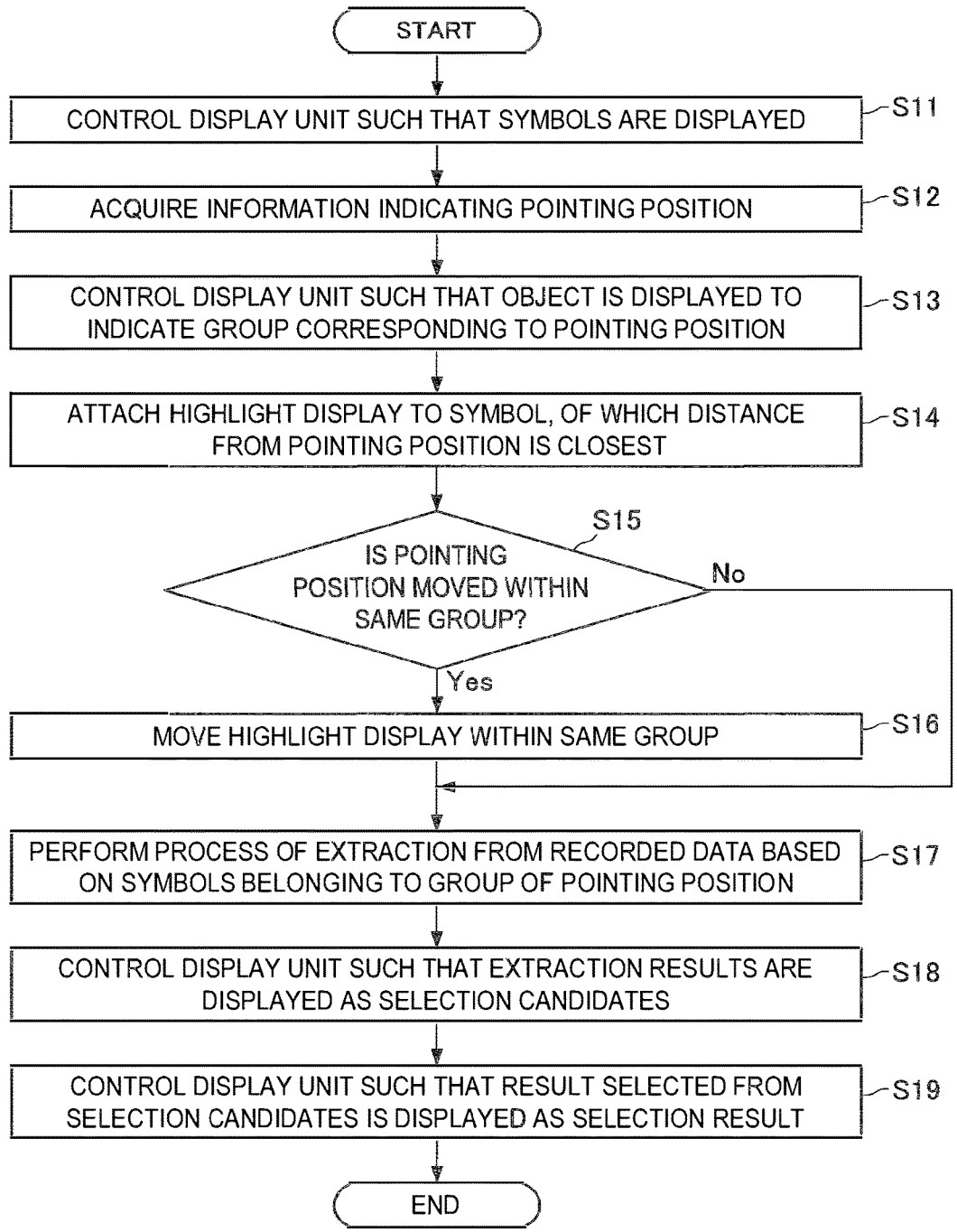
FIG. 6 is a flowchart illustrating an operation flow of a display control apparatus in association with an example of attaching a highlight display to a symbol.

Subsequently, the operation flow of the display control apparatus 10 according to the embodiment of the present disclosure will be described with reference to FIG. 6 (with reference to other drawings as appropriate). In particular, FIG. 6 is a flowchart illustrating the operation flow of the display control apparatus 10 in association with an example of attaching a highlight display to a symbol. Since the example illustrated in FIG. 6 is an example of the operation flow of the display control apparatus 10, the operation flow of the display control apparatus 10 is not limited to the example illustrated in FIG. 6.

First, the display control unit 112 controls the display unit 160 such that a plurality of symbols is displayed (S11). In the example illustrated in FIG. 5, the symbol input screen 163-5 is illustrated as a screen on which the plurality of symbols is displayed. Subsequently, when the input unit 120 receives, from the user, the input of information indicating a pointing position for specifying one or more symbols among the plurality of symbols, the position acquisition unit 111 acquires the information indicating the pointing position from the input unit 120 (S12).

Subsequently, the display control unit 112 controls the display unit 160 such that an object indicating a group corresponding to the pointing position is displayed (S13). For example, in the example illustrated in FIG. 5, an object Obj indicating a group G2 corresponding to the pointing position P is displayed. At this time, the display control unit 112 attaches a highlight display to a symbol, of which a distance from the pointing position is closest (S14). In the example illustrated in FIG. 5, the highlight display H is attached to the symbol "s", of which the distance from the pointing position P is closest.

Subsequently, in a case where the pointing position is not moved within the same group ("No" in S15), the display control unit 112 proceeds to operation S17. On the other hand, in a case where the pointing position is moved within the same group ("Yes" in S15), the display control unit 112 moves the highlight display H within the same group (S16). In the example illustrated in FIG. 5, the highlight display H is moved within the group G2, based on the movement from the pointing position P1 to the pointing position P2.

Subsequently, the display control unit 112 performs a process of extraction from recorded data, based on a plurality of symbols belonging to the group of the pointing position (S17). Then, the display control unit 112 controls the display unit 160 such that extraction results are displayed as selection candidates (S18). Subsequently, when the user performs an operation of selection from the selection candidates, the display control unit 112 controls the display unit 160 such that the result selected from the selection candidates is displayed as the selection result (S19). The operation may be ended after the displaying of the selection result as illustrated in FIG. 6, but the operation may also proceed to S12. The user can edit a sentence by adding a plurality of selection results in sequence.

In the above, a case where a boundary between the groups is unchanged was mainly described. However, the boundary between the groups may be unchanged or may be dynamically changed. That is, the display control unit 112 may dynamically change the boundary between the groups. The boundary between the groups may be changed at any timing. As one example, in a case where extraction results are extracted based on a plurality of symbols belonging to the same group, respectively, the display control unit 112 may change the boundary between the groups such that the plurality of symbols belongs to different groups.

Figure 7:
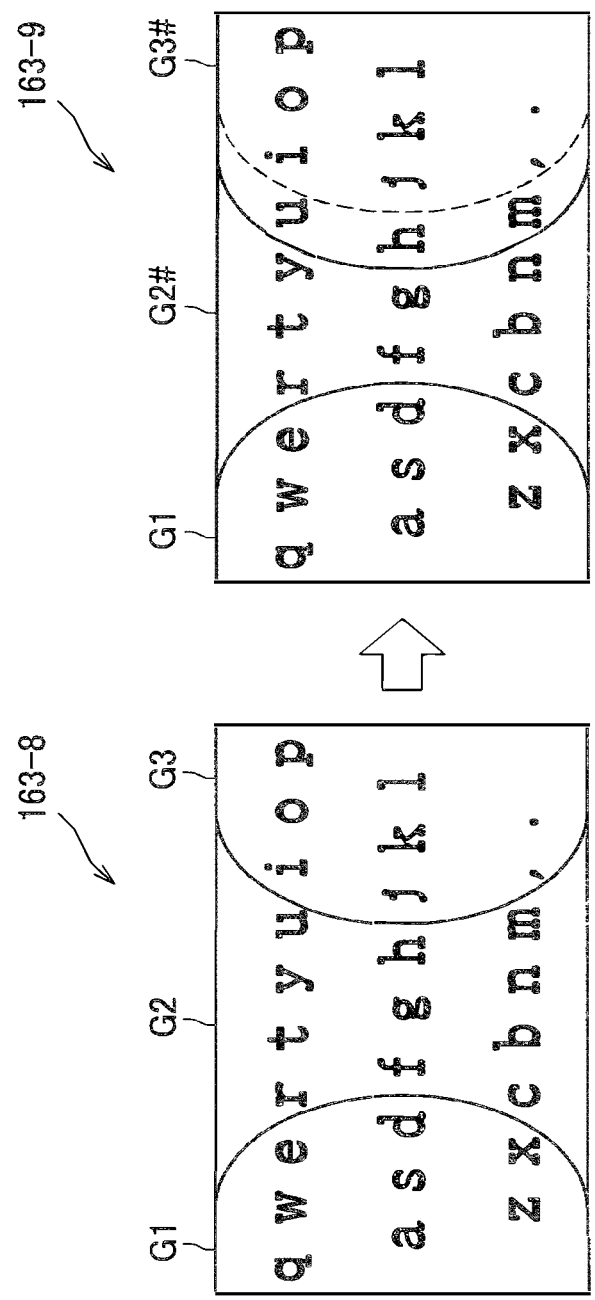
FIG. 7 is a diagram illustrating an example of changing a boundary between groups in a case where extraction results are extracted based on a plurality of symbols belonging to the same group, respectively.

FIG. 7 is a diagram illustrating an example of changing a boundary between groups in a case where extraction results are extracted based on a plurality of symbols belonging to the same group, respectively. Referring to FIG. 7, as in the symbol input screen 163-1, a plurality of symbols is displayed on a symbol input screen 163-8. Also, referring to FIG. 7, as in the symbol input screen 163-1, the plurality of symbols displayed in this manner is divided into three groups (groups G1 to G3).

Here, in a case where extraction results are extracted based on a first symbol and a second symbol belonging to the same group, respectively, the display control unit 112 may change the boundary between groups such that the first symbol and the second symbol belong to different groups. If the boundary between the groups is changed in this way, the display control unit 112 can display the extraction result on the display unit 160 as the selection candidate based on one of the first symbol and the second symbol by the operation of selecting the symbol after the change of the boundary. For example, it is assumed that extraction results "come" and "home" are extracted based on symbols "c" and "h" belonging to the group G2. In such a case, as illustrated in a symbol input screen 163-9, the display control unit 112 may change the boundary between the groups such that "c" and "h" belong to different groups (such that "c" belongs to a group G2# and "h" belongs to a group G3#).

In this way, for example, in a case where an operation of selecting the group G2# is performed, the display control unit 112 can display the extraction result on the display unit 160 as the selection candidate based on the symbol "c" belonging to the group G2#. Also, for example, in a case where an operation of selecting the group G3# is performed, the display control unit 112 can display the extraction result on the display unit 160 as the selection candidate based on a symbol "h" belonging to the group G3#.

Figure 8:
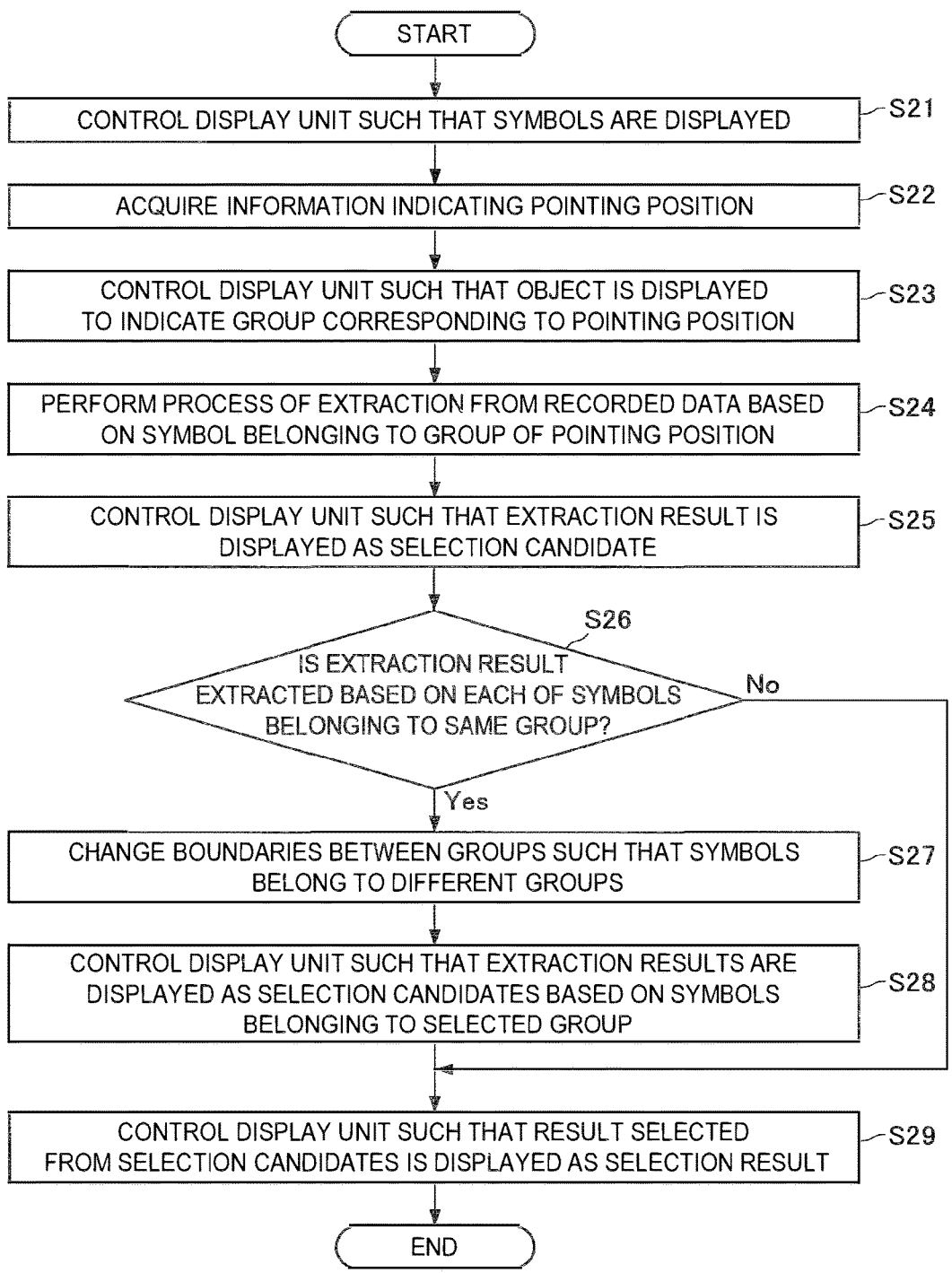
FIG. 8 is a flowchart illustrating an operation flow of a display control apparatus in association with an example of changing a boundary between groups in a case where extraction results are extracted based on a plurality of symbols belonging to the same group, respectively.

Subsequently, the operation flow of the display control apparatus 10 according to the embodiment of the present disclosure will be described with reference to FIG. 8 (with reference to other drawings as appropriate). In particular, FIG. 8 is a flowchart illustrating the operation flow of the display control apparatus 10 in association with an example of changing a boundary between groups in a case where extraction results are extracted based on a plurality of symbols belonging to the same group. Since the example illustrated in FIG. 8 is an example of the operation flow of the display control apparatus 10, the operation flow of the display control apparatus 10 is not limited to the example illustrated in FIG. 8.

First, the display control unit 112 controls the display unit 160 such that a plurality of symbols is displayed (S21). In the example illustrated in FIG. 7, the symbol input screen 163-8 is illustrated as a screen on which the plurality of symbols is displayed. Subsequently, when the input unit 120 receives, from the user, the input of information indicating a pointing position for specifying one or more symbols among the plurality of symbols, the position acquisition unit 111 acquires the information indicating the pointing position from the input unit 120 (S22). Subsequently, the display control unit 112 controls the display unit 160 such that an object indicating a group corresponding to the pointing position is displayed (S23). Subsequently, the display control unit 112 performs a process of extraction from recorded data, based on a plurality of symbols belonging to the group of the pointing position (S24). Then, the display control unit 112 controls the display unit 160 such that extraction results are displayed as selection candidates (S25). Here, the display control unit 112 determines whether extraction results are extracted based on the plurality of symbols belonging to the same group (S26).

In a case where the extraction results are extracted based on the plurality of symbols belonging to the same group ("No" in S26), the display control unit 112 proceeds to operation S29. On the other hand, in a case where the extraction results are extracted based on the plurality of symbols belonging to the same group ("Yes" in S26), the display control unit 112 changes the boundary between the groups such that the plurality of symbols belongs to different groups (S27). When the user performs an operation of selecting a group, the display control unit 112 controls the display unit 160 such that the extraction results are displayed as the selection candidates based on the plurality of symbols belonging to the selected group (S28). Subsequently, when the user performs an operation of selection from the selection candidates, the display control unit 112 controls the display unit 160 such that the result selected from the selection candidates is displayed as the selection result (S29). The operation may be ended after the displaying of the selection result as illustrated in FIG. 8, but the operation may also proceed to S22. The user can edit a sentence by adding a plurality of selection results in sequence.

In the above, the example of changing the boundary between the groups such that the plurality of symbols belongs to different groups in the case where the extraction results are extracted based on the plurality of symbols belonging to the same group was described. Here, the boundary between the groups may be changed according to the direction of the display unit 160. For example, when boundaries between groups are different according to whether the display unit 160 is horizontally long or vertically long, it is possible to display an object easily viewable to the user. Therefore, in the following, an example in which the display control unit 112 changes a boundary between groups according to the direction of the display unit 160 will be described.

The direction of the display unit 160 may be calculated based on at least one of an image captured by an imaging device and a result measured by an acceleration sensor. For example, the display control unit 112 may specify a gravitational direction from the result measured by the acceleration sensor and calculate the direction of the display unit 160 based on the gravitational direction. Also, the display control unit 112 may detect a face region or an eye region from the image captured by the imaging device and calculate the direction of the display unit 160 based on the direction of the face region or the eye region. Alternatively, the direction of the display unit 160 may be preset by the user.

Figure 9:
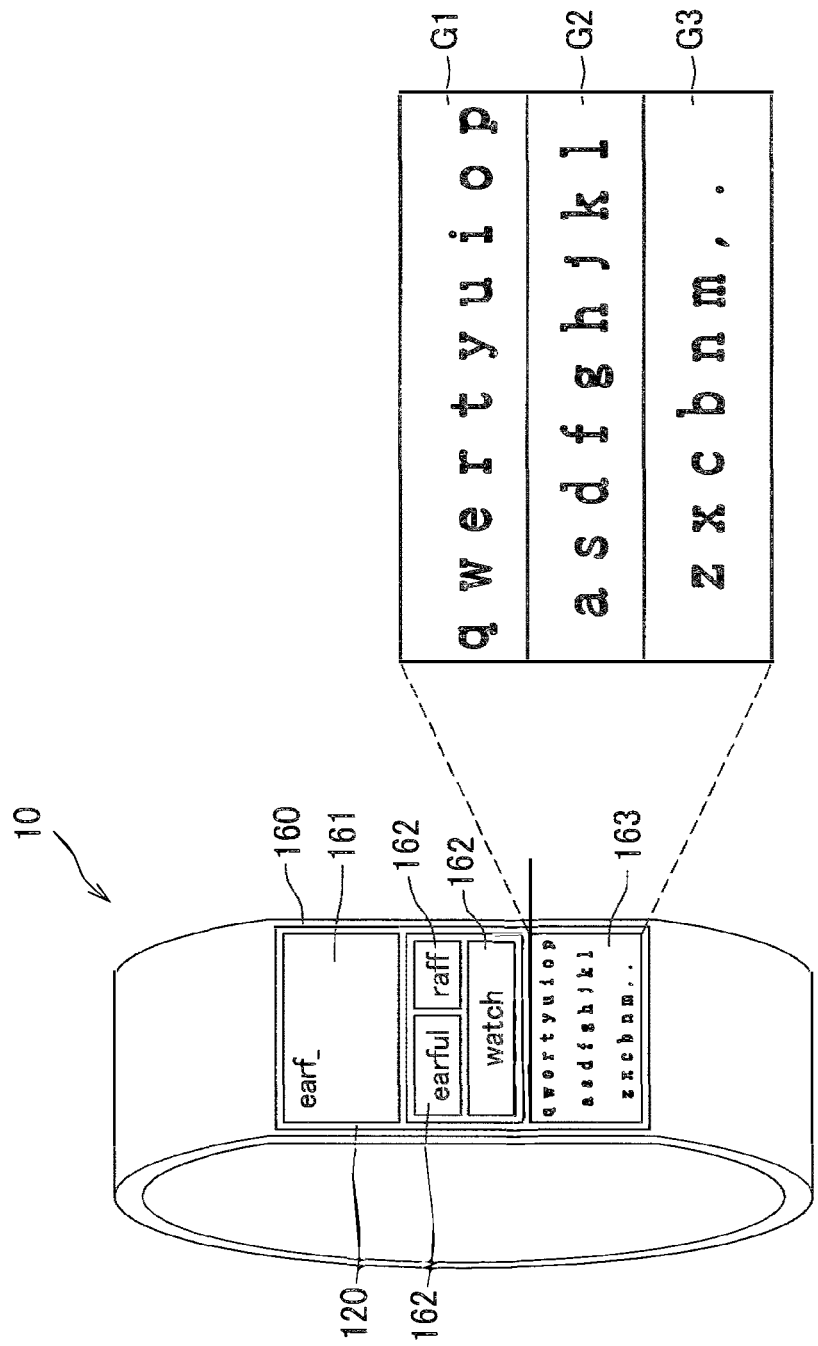
FIG. 9 is a diagram illustrating an example of a screen displayed in a case where a display unit is vertically long.
Figure 10:
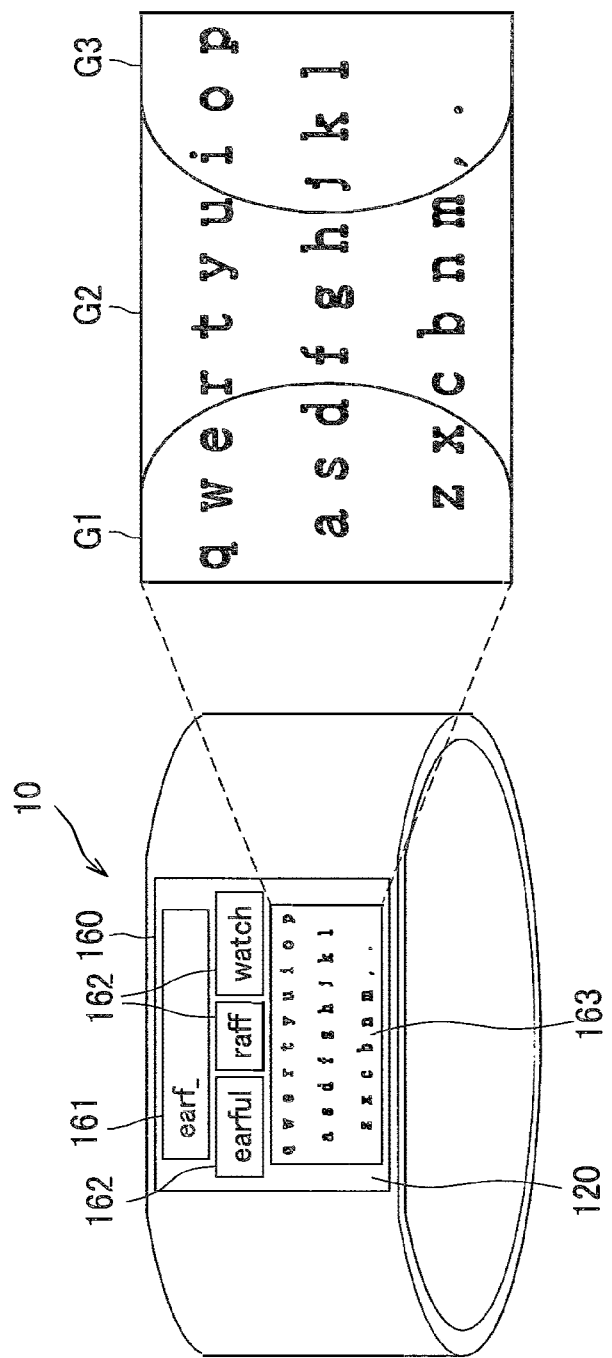
FIG. 10 is a diagram illustrating an example of a screen displayed in a case where a display unit is horizontally long.

Specific examples will be described below with reference to FIGS. 9 and 10. FIG. 9 is a diagram illustrating an example of a screen displayed in a case where the display unit 160 is vertically long. Also, FIG. 10 is a diagram illustrating an example of a screen displayed in a case where the display unit 160 is horizontally long. Referring to FIGS. 9 and 10, in the case where the display unit 160 is vertically long, the selection result screen 161 is vertically longer, more selection candidate screens 162 are vertically disposed, and the symbol input screen 163 is vertically longer, as compared with the case where the display unit 160 is horizontally long. If such a screen display is done, it is possible to display a screen friendly for a user, regardless of the direction of the display unit 160.

Also, referring to FIG. 9, in the case where the display unit 160 is vertically long, the boundaries between groups are displayed in a horizontal direction such that the groups G1 to G3 are vertically aligned. On other hand, referring to FIG. 10, in the case where the display unit 160 is horizontally long, the boundaries between groups are displayed in a vertical direction such that the groups G1 to G3 are horizontally aligned. In this way, since the direction of the boundary between the groups is changed according to the direction of the display unit 160 by the display control unit 112, the object indicating the group corresponding to the pointing position can be displayed to be viewed more easily.

Referring to FIGS. 9 and 10, in the case where the display unit 160 is vertically long and in the case where the display unit 160 is horizontally long, the position of the symbol input screen 163 in the display unit 160 is changed. In this way, since the position of the symbol input screen 163 in the display unit 160 is changed according to the direction of the display unit 160 by the display control unit 112, the symbols can be displayed to be viewed more easily.

Also, referring to FIGS. 9 and 10, in the case where the display unit 160 is vertically long and in the case where the display unit 160 is horizontally long, the direction of the symbol input screen 163 based on the direction of the display unit 160 is changed. In this way, since the direction of the symbol input screen 163 based on the direction of the display unit 160 is changed according to the direction of the display unit 160 by the display control unit 112, the symbols can be displayed to be viewed more easily.

Figure 11:
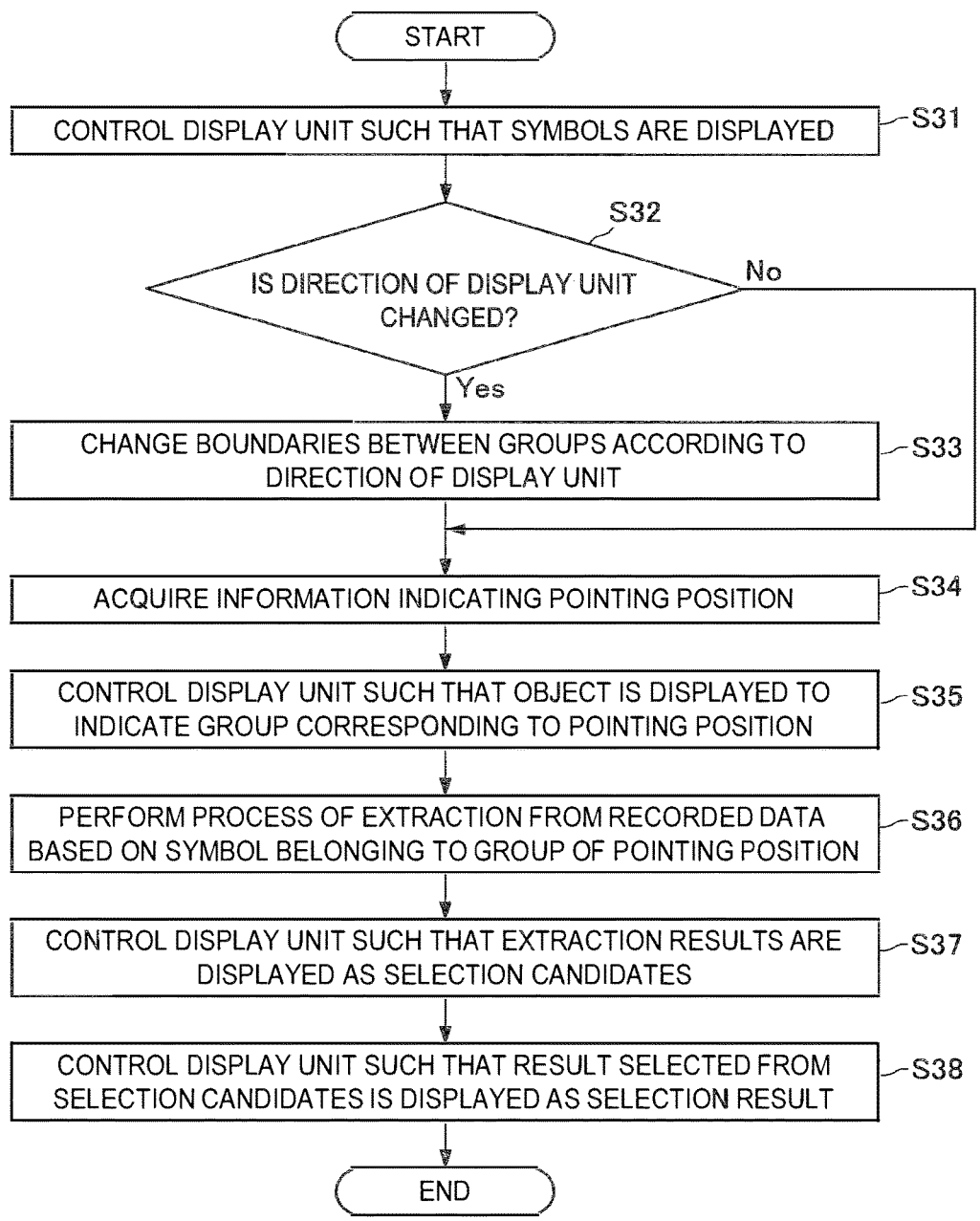
FIG. 11 is a flowchart illustrating an operation flow of a display control apparatus in association with an example of changing a boundary between groups according to a direction of a display unit.

Subsequently, the operation flow of the display control apparatus 10 according to the embodiment of the present disclosure will be described with reference to FIG. 11 (with reference to other drawings as appropriate). In particular, FIG. 11 is a flowchart illustrating the operation flow of the display control apparatus 10 in association with an example of changing boundaries between groups according to the direction of the display unit 160. Since the example illustrated in FIG. 11 is an example of the operation flow of the display control apparatus 10, the operation flow of the display control apparatus 10 is not limited to the example illustrated in FIG. 11.

First, the display control unit 112 controls the display unit 160 such that a plurality of symbols is displayed (S31). In the example illustrated in FIG. 9, the symbol input screen 163 is illustrated as a screen on which the plurality of symbols is displayed. Here, the display control unit 112 determines whether the direction of the display unit 160 is changed (S32). In a case where the direction of the display unit 160 is not changed ("No" in S32), the display control unit 112 proceeds to operation S34. On the other hand, in a case where the direction of the display unit 160 is changed ("Yes" in S32), the display control unit 112 changes boundaries between groups according to the direction of the display unit 160 (S33).

For example, in a case where the direction of the display unit 160 is changed such that the display unit 160 becomes horizontally long as in the example illustrated in FIG. 10, the display control unit 112 may change boundaries between groups as in the example illustrated in FIG. 10. Subsequently, when the input unit 120 receives, from the user, the input of information indicating a pointing position for specifying one or more symbols among the plurality of symbols, the position acquisition unit 111 acquires the information indicating the pointing position from the input unit 120 (S34). Subsequently, the display control unit 112 controls the display unit 160 such that an object indicating a group corresponding to the pointing position is displayed (S35). Subsequently, the display control unit 112 performs a process of extraction from recorded data, based on a plurality of symbols belonging to the group of the pointing position (S36). Then, the display control unit 112 controls the display unit 160 such that extraction results are displayed as selection candidates (S37). Subsequently, when the user performs an operation of selection from the selection candidates, the display control unit 112 controls the display unit 160 such that the result selected from the selection candidates is displayed as the selection result (S38). The operation may be ended after the displaying of the selection result as illustrated in FIG. 11, but the operation may also proceed to S32. The user can edit a sentence by adding a plurality of selection results in sequence.

In the above, the example of changing the boundaries between the groups according to the direction of the display unit 160 was described. As the method of changing boundaries between groups, various other methods are considered. For example, the display control unit 112 may change boundaries between groups according to the size of the display unit 160. More specifically, the display control unit 112 may change boundaries between groups such that the number of the groups is increased as the size of the display unit 160 is increased. In this way, the object indicating the group corresponding to the pointing position can be displayed to be easily viewed.

Also, the boundaries between the groups may be changed according to a deviation amount of the pointing position and the symbol. For example, the display control unit 112 may change the boundaries between the groups based on the deviation amount of the pointing position and the symbol of which a distance from the pointing position is closest. Specifically, the boundaries between the groups may be changed such that the number of the groups is increased as the deviation amount of the pointing position and the symbol of which the distance from the pointing position is closest is decreased. This is because as the deviation amount is decreased, the accuracy of pointing by the user becomes higher. In a case where a plurality of deviation amounts is acquired, a result (for example, a dispersion value, an average value, or the like) obtained by performing a predetermined operation on the plurality of deviation amount may be used as a substitute for the deviation amount.

Alternatively, the display control unit 112 may change boundaries between groups, based on a deviation amount of the pointing position and the selection result. For example, specifically, the boundaries between the groups may be changed such that the number of the groups is increased as the deviation amount of the pointing position and the selection result is decreased. This is because it can be presumed that as the deviation amount is decreased, the accuracy of pointing by the user becomes higher. In a case where a plurality of deviation amounts is acquired, a result (for example, a dispersion value, an average value, or the like) obtained by performing a predetermined operation on the plurality of deviation amount may be used as a substitute for the deviation amount.

Also, portions other than the boundaries between groups may be changed. For example, the display control unit 112 may dynamically change an arrangement of at least a part of a plurality of symbols. Specifically, the display control unit 112 may dynamically change an arrangement of at least a part of a plurality of symbols according to the direction of the display unit 160. In the examples illustrated in FIGS. 9 and 10, the arrangement of all the plurality of symbols is not changed regardless of the direction of the display unit 160, but the display control unit 112 may change the arrangement of at least a part of the plurality of symbols according to the direction of the display unit 160.

For example, in the case where the display unit 160 is vertically long, the display control unit 112 may change the arrangement of the plurality of symbols such that the number of symbols arranged in the vertical direction is increased, as compared with the display unit 160 is horizontally long. In the example illustrated in FIG. 9, in the case where the display unit 160 is vertically long, the number of symbols arranged in the vertical direction is three. In the example illustrated in FIG. 10, in the case where the display unit 160 is horizontally long, the number of symbols arranged in the horizontal direction is three. However, in the case where the display unit 160 is vertically long, the display control unit 112 may change the arrangement of the plurality of symbols such that the number of symbols arranged in the vertical direction becomes four or more.

Also, for example, the display control unit 112 may change an arrangement direction of a plurality of symbols in a direction corresponding to a type of the plurality of symbols. In the case of symbols that are desirable when arranged in the vertical direction (for example, a case where symbols are Chinese characters), the display control unit 112 may change the arrangement direction of the plurality of symbols such that more symbols are arranged in the vertical direction than in the horizontal direction. Also, in the case of symbols that are desirable when arranged in the horizontal direction (for example, a case where symbols are numbers, marks, alphabets, or the like), the display control unit 112 may change the arrangement direction of the plurality of symbols such that more symbols are arranged in the horizontal direction than in the vertical direction.

Also, as described above, the priority may be assigned to the result extracted from the recorded data. As the symbol is closer to the pointing position, higher priority is assigned to the symbol. Specifically, the display control unit 112 may calculate distances from the pointing position to each symbol and assign priority to each symbol according to each distance. However, parameters other than the distance from the pointing position to each symbol may be additionally considered.

For example, it is considered that the possibility of erroneous pointing between symbols within the same group is higher than the possibility of erroneous pointing between symbols within different groups. Therefore, when the distance from the pointing position to each symbol is calculated, it is desirable that the display control unit 112 arranges the symbols of the different groups to be spaced apart from one another than in the case of the symbols of the same group. A specific example will be described below with reference to FIG. 12.

Figure 12:
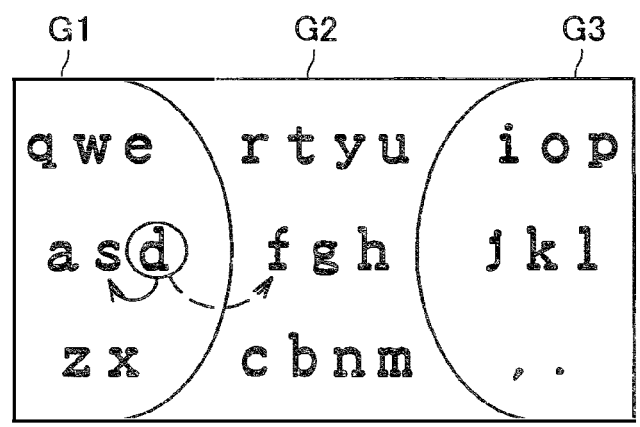
FIG. 12 is a diagram for describing an example of a calculation of a priority of each symbol.

FIG. 12 is a diagram for describing an example of a calculation of a priority of each symbol. As illustrated in FIG. 12, it is considered that the possibility of erroneous pointing between symbols within the same group (between symbol "d" and symbol "s") is higher than the possibility of erroneous pointing between symbols within different groups (between symbol "d" and symbol "f"). Therefore, for example, as illustrated in FIG. 12, the display control unit 112 may correct the position of each symbol such that the symbols of different groups are spaced away from one another than the symbols of the same group.

Figure 13:
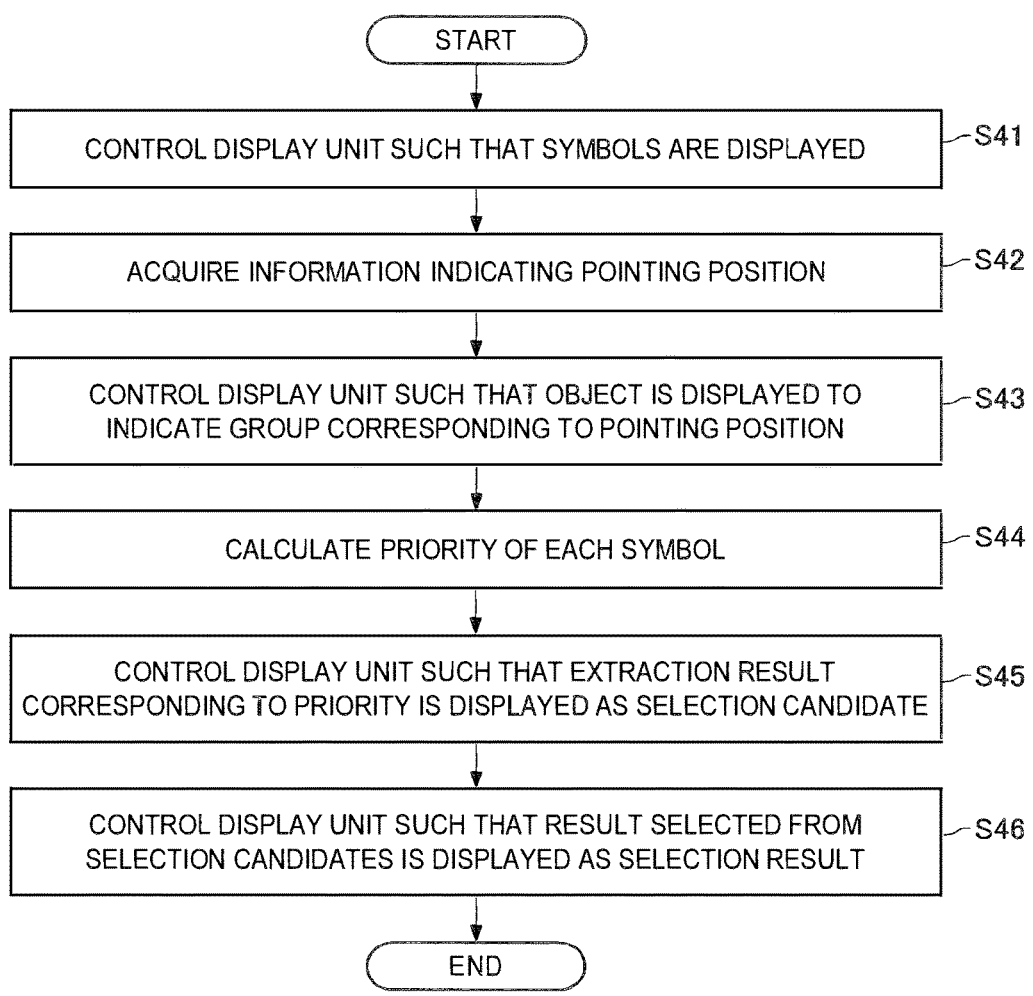
FIG. 13 is a flowchart illustrating an operation flow of a display control apparatus in association with an example of considering a priority of each symbol.

Subsequently, the operation flow of the display control apparatus 10 according to the embodiment of the present disclosure will be described with reference to FIG. 13 (with reference to other drawings as appropriate). In particular, FIG. 13 is a flowchart illustrating the operation flow of the display control apparatus 10 in association with the example of considering the priority of each symbol. Since the example illustrated in FIG. 13 is an example of the operation flow of the display control apparatus 10, the operation flow of the display control apparatus 10 is not limited to the example illustrated in FIG. 13.

First, the display control unit 112 controls the display unit 160 such that a plurality of symbols is displayed (S41). Subsequently, when the input unit 120 receives, from the user, the input of information indicating a pointing position for specifying one or more symbols among the plurality of symbols, the position acquisition unit 111 acquires the information indicating the pointing position from the input unit 120 (S42). Subsequently, the display control unit 112 controls the display unit 160 such that an object indicating a group corresponding to the pointing position is displayed (S43). Subsequently, the display control unit 112 calculates priority of each symbol (S44). For example, the display control unit 112 may calculate higher priority as the symbol is closer to the pointing position. Specifically, the display control unit 112 may calculate distances from the pointing position to each symbol and assign priority to each symbol according to each distance. However, as described above, parameters other than the distance from the pointing position to each symbol may be additionally considered.

Subsequently, the display control unit 112 performs a process of extraction from recorded data, based on a plurality of symbols belonging to the group of the pointing position. Then, the display control unit 112 controls the display unit 160 such that extraction results corresponding to the priority of each symbol are displayed as selection candidates (S45). When the user performs an operation of selection from the selection candidates, the display control unit 112 controls the display unit 160 such that the result selected from the selection candidates is displayed as the selection result (S46). The operation may be ended after the displaying of the selection result as illustrated in FIG. 13, but the operation may also proceed to S42. The user can edit a sentence by adding a plurality of selection results in sequence. In the above, the function of the display control apparatus 10 according to the embodiment of the present disclosure was described in detail.

4. EXAMPLE OF HARDWARE CONFIGURATION OF DISPLAY CONTROL APPARATUS

Subsequently, an example of hardware configuration of the display control apparatus 10 according to the embodiment of the present disclosure will be described. FIG. 14 is a diagram illustrating an example of hardware configuration of the display control apparatus 10 according to the embodiment of the present disclosure. However, the example of hardware configuration illustrated in FIG. 14 is merely an example hardware configuration of the display control apparatus 10. Therefore, the hardware configuration of the display control apparatus 10 is not limited to the example illustrated in FIG. 14.

As illustrated in FIG. 14, the display control apparatus 10 include a central processing unit (CPU) 801, a read only memory (ROM) 802, a random access memory (RAM) 803, a sensor 804, an input device 808, an output device 810, a storage device 811, a drive 812, and a communication device 815.

The CPU 801 functions as an arithmetic processing unit and a controller, and controls overall operations inside the display control apparatus 10 according to various programs. Also, the CPU 801 may be a microprocessor. The ROM 802 stores programs or arithmetic parameters data and the like which are used by the CPU 801. The RAM 803 temporarily stores programs which are used in the execution of the CPU 801, or parameters which are appropriately changed upon execution thereof. These are mutually connected through a host bus configured by a CPU bus or the like.

The sensor 804 includes various detection sensors, such as a state detection sensor for detecting a state of the display control apparatus 10, and peripheral circuits thereof.

Examples of the sensor 804 may include a positioning sensor, a tilt sensor, an acceleration sensor, a direction sensor, a temperature sensor, a humidity sensor, and an illuminance sensor. A signal detected by the sensor 804 is transmitted to the CPU 801. In this way, the CPU 801 can know the state (position, tilt, acceleration, direction, temperature, humidity, illumination, or the like) of the display control apparatus 10.

The input device 808 includes an operation unit configured to allow the user to input information, such as a mouse, a keyboard, a touch panel, a button (power button or the like), a microphone, a switch, a dial, and a lever, and an input control circuit configured to generate an input signal based on a user input and output the input signal to the CPU 801. The user of the display control apparatus 10 can input various data or instruct the processing operations to the display control apparatus 10 by operating the input device 808. Also, the installation position of the operation unit is not particularly limited. For example, the operation unit may be installed on a housing side surface of the display control apparatus 10, or may be installed on the same surface as the surface on which a display is installed.

The output device 810 may include a display device such as, for example, a liquid crystal display (LCD), an organic light emitting diode (OLED), and a lamp. Furthermore, the output device 810 may include an audio output device such as a speaker and a headphone. For example, the display device displays a captured image or a generated image. On the other hand, the audio output device converts audio data or the like into audio.

The storage device 811 is a device for data storage that is configured as an example of the storage unit of the display control apparatus 10. The storage device 811 may include a storage medium, a recording device that records data in the storage medium, a reading device that reads data from the storage medium, and an erasing device that erases data recorded on the storage medium. The storage device 811 stores programs or various data which are executed by the CPU 801.

The drive 812 is a reader/writer for storage medium and is internally or externally mounted in the display control apparatus 10. The drive 812 reads information recorded in a removable storage medium, such as a magnetic disk, an optical disk, a magneto-optical disk, or a semiconductor memory mounted thereon, and outputs the read information to the RAM 803. Also, the drive 812 can write information to the removable storage medium.

The communication device 815 communicates with an external device via a network (or directly). The communication device 815 may be an interface for wireless communication. For example, the communication device 815 may include a communication antenna, a radio frequency (RF) circuit, a baseband processor, and the like. Specific examples of the interface for wireless communication may include a communication unit such as a modem supporting a communication scheme, such as a code division multiple access (CDMA), a wideband code division multiple access (W-CDMA), a long term evolution (LTE), a wireless fidelity (Wi-Fi, registered trademark).

Also, the communication device 815 may be an interface for wired communication. For example, the communication device 815 may include a connection terminal, a transmission circuit, and a circuit for other communication processing. Also, the CPU 801 and the communication device 815 may be configured by a single chip, or may be implemented as separate devices. Also, although not illustrated in FIG. 14, the display control apparatus 10, for example, may be driven by power supplied from a power source such as a rechargeable battery, and the power source may be configured to be detachable from the display control apparatus 10.

In the above, the example of hardware configuration of the display control apparatus 10 according to the embodiment of the present disclosure was described. For example, the communication unit 150, the input unit 120, the display unit 160, and the storage unit 140 can be realized by the communication device 815, the input device 808, the output device 810, and the storage device 811, respectively. Also, the control unit 110 (in particular, the position acquisition unit 111 and the display control unit 112) can be realized by the CPU 801. Therefore, a program causing a computer to function as the display control apparatus 10 including the position acquisition unit 111 and the display control unit 112 can be stored in the storage device 811, the ROM 802, or the RAM 803, and the CPU 801 can execute the relevant program.

Also, the configuration for outputting display control information to the display unit 160 corresponds to an example of the "output unit". As a specific example, the output unit can be realized by a device such as a signal line positioned between the CPU 801 and the bus 806 illustrated in FIG. 14. Also, the display control information can be realized by a video signal such as an RGB signal or a high-definition multimedia interface (HDMI) used for controlling the output device 810 (for example, display, or the like) by the CPU 801.

If the operation of the above-described display control apparatus 10 is realized, the position of each configuration illustrated in FIG. 2 is not particularly limited. As a specific example, each of the input unit 120, the display unit 160, control unit 110, and the storage unit 140 may be provided in different information processing devices connected through the network. In this case, the information processing device in which the control unit 110 and the storage unit 140 are provided, for example, may correspond to a server such as a web server or a cloud server, and the input unit 120 and the display unit 160 may correspond to a client connected to the network.

As described above, in a case where the function of the display control apparatus 10 is realized by the client and the server, the configuration (for example, communication interface such as a modem) in which the server including the display control unit 112 transmits the display control information to the client through the network corresponds to an example of the "output unit". Also, in a case where the function of the display control apparatus 10 is realized by the client and the server, the contents of the display control information may be appropriately changed according to the system configuration. As a specific example, in a case where the described-above screen is displayed on the browser of the client side, the display control information may be realized by a markup language, such as a hyper text markup language (HTML), a standard generalized markup language (SGML), an extensible markup language (XML), or the like.

Also, the above display control information is merely an example and may be appropriately changed according to a method for transmitting and receiving information between the display control unit 112 and the display unit 160, a type of a transmission line, or a medium (for example, a wireless signal or light) used in information transmission and reception.

Also, in the above, the example in which the display control apparatus 10 is realized by the wearable display device was described. However, in a case where the function of the display control apparatus 10 is realized by the client and the server, the client may be realized by the wearable display device.

5. CONCLUSION

As described above, according to the embodiment of the present disclosure, there is provided the display control apparatus 10 including the display control unit 112 configured to control the display unit 160 such that a plurality of symbols is displayed to be visible to the user, and the position acquisition unit 111 configured to acquire information indicating the pointing position for specifying one or more symbols among the plurality of symbols. The display control unit 112 controls the display unit 160 such that a predetermined object is displayed to indicate a group to which a plurality of symbols belongs according to the pointing position.

According to such a configuration, since the group is greater than the symbol, it is possible to allow a user to more reliably recognize information related to the symbol corresponding to the pointing position. Also, it is possible to reduce a possibility that will give the user a feeling of pressure that the user has to perform an accurate pointing with respect to a desired symbol, thereby allowing the user to perform the pointing more comfortably. Furthermore, since the possibility that an incorrect pointing will be performed between groups is smaller than the possibility that an incorrect pointing will be performed between symbols, it is possible to reduce the possibility that an incorrect pointing will be performed.

The preferred embodiments of the present disclosure have been described in detail with reference to the appended drawings, but the technical scope of the present disclosure is not limited to such examples. It should be understood by those skilled in the art that it is apparent that various modifications and alterations may occur within the scope of technical idea described in the appended claims and this is understood that it naturally belongs to the technical range of the disclosure.

For example, the operation of the display control apparatus 10 is not necessarily performed in time series in order described in the flowchart. For example, the operation of the display control apparatus 10 may be performed in a different order from that described in the flowchart, or at least a part of the operation described in the flowchart may be performed in parallel. Also, hardware embedded in the computer, such as a CPU, a ROM, and a RAM, can be implemented by a program for exhibiting the same functions as the configuration of the above-described display control apparatus 10. Also, it is possible to provide a non-transitory computer-readable recording medium storing the relevant program. Also, the effects described herein are only for illustrative or explanatory purposes, not limiting purposes. That is, it is apparent to those skilled in the art that other effects from the description herein can be provided, in addition to or alternative to the above effects, in the relevant technology in the disclosure.

Additionally, the present technology may also be configured as below.

(1) A display control apparatus including:
a display control unit configured to control a display unit in a manner that a plurality of symbols is visibly displayed to a user; and
a position acquisition unit configured to acquire information indicating a pointing position for specifying one or more symbols among the plurality of symbols,
wherein the display control unit controls the display unit in a manner that a predetermined object is displayed to indicate a group to which the plurality of symbols belongs according to the pointing position.

(2) The display control apparatus according to (1),
wherein the display control unit dynamically changes boundaries between the groups.

(3) The display control apparatus according to (2),
wherein the display control unit changes boundaries between the groups according to a direction of the display unit.

(4) The display control apparatus according to (2),
wherein the display control unit changes boundaries between the groups according to a size of the display unit.

(5) The display control apparatus according to any one of (1) to (4),
wherein the display control unit dynamically changes a position of at least a part of the plurality of symbols.

(6) The display control apparatus according to (5),
wherein the display control unit changes an arrangement direction of the plurality of symbols in a direction corresponding to a type of the plurality of symbols.

(7) The display control apparatus according to any one of (1) to (6),
wherein the display control unit displays results extracted from recorded data on the display unit based on a symbol belonging to a group of the pointing position.

(8) The display control apparatus according to (7),
wherein the display control unit displays the extracted results on the display unit as selection candidates and displays a result selected from the selection candidates on the display unit as a selection result.

(9) The display control apparatus according to (7),
wherein the display control unit preferentially displays the extraction result on the display unit based on the symbol, of which a distance from the pointing position is closest.

(10) The display control apparatus according to (9),
wherein the display control unit changes the boundaries between the groups based on a deviation amount of the pointing position and the symbol of which the distance from the pointing position is closest.

(11) The display control apparatus according to (9),
wherein, when the distance from the pointing position is calculated, the display control unit arranges the symbols of different groups to be spaced apart from one another than in the symbols of a same group.

(12) The display control apparatus according to (7),
wherein, when an extraction result is extracted based on each of a first symbol and a second symbol belonging to a same group, the display control unit changes the boundaries between the groups in a manner that the first symbol and the second symbol belong to different groups.

(13) The display control apparatus according to any one of (1) to (12),
wherein the display control unit attaches a highlight display to a symbol, of which a distance from the pointing position is closest.

(14) The display control apparatus according to (13),
wherein, when the pointing position is moved within a same group, the display control unit moves the highlight display within the same group.

(15) The display control apparatus according to any one of (1) to (14),
wherein the display control unit controls the display unit in a manner that the extraction result is displayed on the display unit, based on a symbol string generated by sequentially combining symbols belonging to the group of the pointing position whenever the pointing position is pointed.

(16) The display control apparatus according to any one of (1) to (15),
wherein the pointing position is determined based on at least one of a line-of-sight detection result and a result detected by a touch panel.

(17) The display control apparatus according to any one of (1) to (16),
wherein a direction of the display unit is calculated based on at least one of an image captured by an imaging device and a result measured by an acceleration sensor.

(18) The display control apparatus according to any one of (1) to (16),
wherein a direction of the display unit is preset by a user.

(19) A display control method including:
controlling a display unit in a manner that a plurality of symbols is visibly displayed to a user;
acquiring information indicating a pointing position for specifying one or more symbols among the plurality of symbols; and
causing a processor to control the display unit in a manner that a predetermined object is displayed to indicate a group to which the plurality of symbols belongs according to the pointing position.

(20) A program for causing a computer to function as a display control apparatus including:
a display control unit configured to control a display unit in a manner that a plurality of symbols is visibly displayed to a user; and
a position acquisition unit configured to acquire information indicating a pointing position for specifying one or more symbols among the plurality of symbols,
wherein the display control unit controls the display unit in a manner that a predetermined object is displayed to indicate a group to which the plurality of symbols belongs according to the pointing position.

What is claimed is:

1. A wearable apparatus, comprising:
a display screen; and
circuitry configured to:
control the display screen to display a plurality of groups with at least one boundary at a first position, wherein each of the plurality of groups includes a plurality of characters;
acquire a pointing position that specifies one of the displayed plurality of groups;
extract at least one extraction result based on corresponding at least one character of the specified one of the displayed plurality of groups,
wherein the corresponding at least one character is at a smallest distance from the pointing position among remaining characters of the specified one of the displayed plurality of groups;
control the display screen to further display the extracted at least one extraction result; and
change, based on a deviation amount of the pointing position and the corresponding at least one character, the first position of the at least one boundary between the plurality of groups to a second position.

2. The wearable apparatus according to claim 1,
wherein the circuitry is further configured to change, based on a direction of the display screen, the first position of the at least one boundary to the second position.

3. The wearable apparatus according to claim 1,
wherein the circuitry is further configured to change, based on a size of a display region of the display screen, the first position of the at least one boundary between the plurality of groups to the second position.

4. The wearable apparatus according to claim 1,
wherein the circuitry is further configured to control, based on a character string generated by sequential combination of the corresponding plurality of characters of the specified one of the displayed plurality of groups, the display screen to display the at least one extraction result.

5. A display method, comprising:
in a wearable apparatus:
displaying, by a display screen of the wearable apparatus, a plurality of groups with at least one boundary at a first position, wherein each of the plurality of groups includes a plurality of characters;
acquiring a pointing position that specifies one of the displayed plurality of groups;
extracting at least one extraction result based on corresponding at least one character of the specified one of the displayed plurality of groups,
wherein the corresponding at least one character is at a smallest distance from the pointing position among remaining characters of the specified one of the displayed plurality of groups,
displaying, by the display screen of the wearable apparatus, the extracted at least one extraction result; and
changing, based on a deviation amount of the pointing position and the corresponding at least one character, the first position of the at least one boundary between the plurality of groups to a second position.

6. A non-transitory computer-readable medium having stored thereon, computer-executable instructions, which when executed by a computer, causes the computer to execute operations, the operations comprising:
displaying a plurality of groups with at least one boundary at a first position, wherein each of the plurality of groups includes a plurality of characters;
acquiring a pointing position that specifies one of the displayed plurality of groups;
extracting at least one extraction result based on corresponding at least one character of the specified one of the displayed plurality of groups,
wherein the corresponding at least one character is at a smallest distance from the pointing position among remaining characters of the specified one of the displayed plurality of groups,
displaying the extracted at least one extraction result; and
changing, based on a deviation amount of the pointing position and the corresponding at least one character, the first position of the at least one boundary between the plurality of groups to a second position.

7. The wearable apparatus according to claim 1, wherein the circuitry is further configured to control the display screen to display an object that includes the specified one of the displayed plurality of groups corresponding to the acquired pointing position.

* * * * *